April 25, 1939. S. D. BOSKET Re. 21,056

BUMPER ATTACHMENT

Original Filed Jan. 27, 1936

INVENTOR.
Shelby D. Bosket
BY
Morton S. Brockman
ATTORNEY.

Reissued Apr. 25, 1939

Re. 21,056

UNITED STATES PATENT OFFICE 21,056

BUMPER ATTACHMENT

Shelby D. Bosket, Cleveland, Ohio, assignor to Max E. Gottlieb, Cleveland, Ohio

Original No. 2,093,951, dated September 21, 1937, Serial No. 61,102, January 27, 1936. Application for reissue March 30, 1938, Serial No. 199,026

2 Claims. (Cl. 248—41)

This invention relates to flag or banner supports and particularly to the type which may be quickly and easily attached or removed from a motor vehicle.

An object of this invention is to provide a staff holder which can be securely clamped to a base, such as the bumper of an automobile, without damaging the finish or appearance of the base; and which does not require special tools or implements, or necessitate the change of the present structure to install it thereon or to remove it therefrom.

With these and other objects in view, this invention consists in certain novel features of construction, combination and arrangement of parts to be hereinafter more fully described and claimed. Particular reference being had to the accompanying drawing and specifications in which like parts are designated by like reference characters, and in which:

Figure 1:
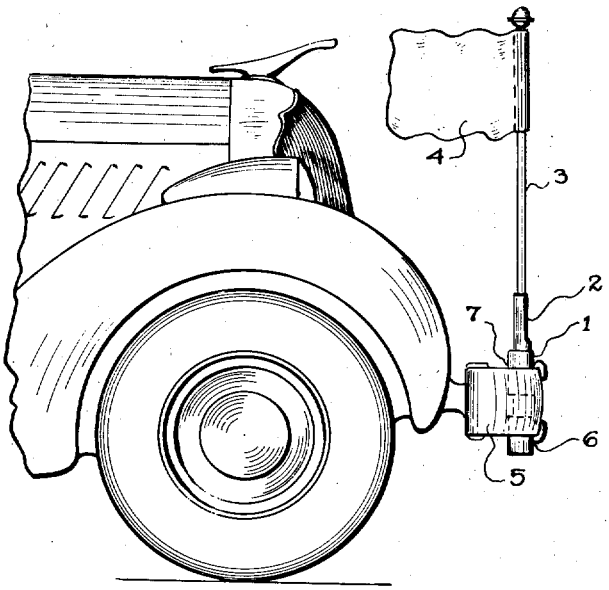
Figure 1 is a fragmentary side elevation showing the front end of a motor vehicle and its front bumper equipped with an attachment constructed in accordance with my invention.

Frequently during the use of a motor vehicle it is desirable to mount thereon a flag, a pennant or some other similar device so that the latter will be clearly viewable from a maximum distance with respect to said vehicle. As for instance, on motor vehicles employed in parades or funeral processions it is desirable to display some form of warning that the vehicles are in procession or traveling in funeral formation, whereby other motor vehicle traffic will be so informed for the purpose of giving it right-of-way. A display of this kind is desired to be made only during the time that it is needed in the parade or procession, and in order that it may be quickly installed and removed, my device embodies a novel self-adjusting clamping means.

My invention consists of a split tubular sleeve 2, the top portion or end of which has a socket suitable for receiving a staff 3 of a flag or banner 4 or other display; and two similar but oppositely disposed clamp sections 6 and 7, each of which clamp sections have channel portions 9 for engaging the lower portion of the sleeve 2.

The clamp sections 6 and 7, each have plate-like portions 10, from which there extends counteracting hook-shaped flanges 11. The plate-like portions 10 and the hook-shaped flanges 11 are covered with a corrugated or roughened cushion material 12, so as not to mar, scratch or disfigure the finish or surface of the base 5 to which it is clamped, and also to hold it securely thereon without rattling.

The clamp section 6 is rigidly attached to and made part of the sleeve 2, with its plate-like portion 10 covering the split or open side of the tubular sleeve 2. The clamp section 7 is similarly affixed to the sleeve 2, but instead of being rigidly attached to the sleeve 2, it is slidably affixed thereon. In the drawing I show the clamp section 6 rigidly attached to the extreme lower end of the sleeve 2 and the movable clamp section 7 affixed and slidable between the clamp section 6 and the staff 3, but it is obvious that their positions could very well be reversed.

To retain the aforementioned clamp section 6 and the movable clamp section 7 in opposition and resistance, I insert a coil expansion spring 8 in the hollow of the split sleeve 2. One end of the spring 8 is attached to the retainer of the clamp section 6 and the opposite end of the spring 8 is similarly affixed to the retainer of the clamp section 7. In the drawing I illustrate the retainers or clutches by the simple extension 6′.

Figure 2:
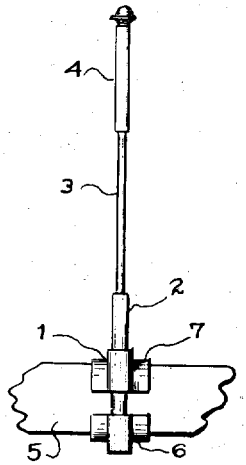
Figure 2 is a fragmentary elevational view showing the device adapted to the bumper.
Figure 3:
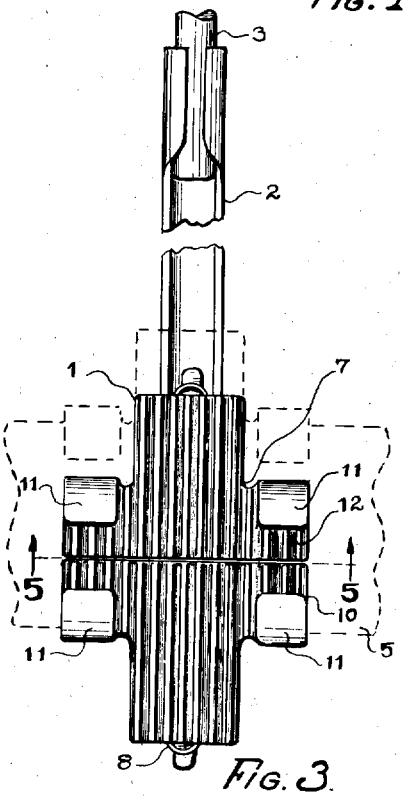
Figure 3 is an enlarged fragmentary rear view of the device showing the gripping elements of the clamp. The dotted lines indicating the clamp expanded and attached to an automobile bumper.
Figure 4:
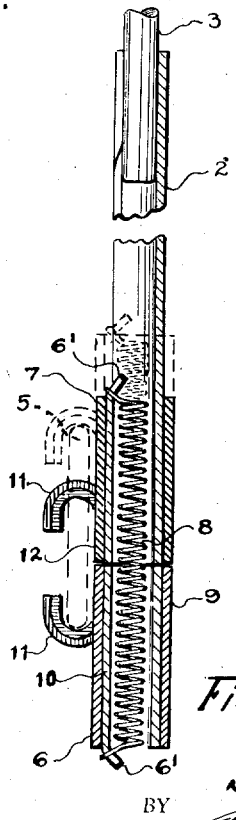
Figure 4 is a fragmentary vertical sectional view showing the clamp.
Figure 5:
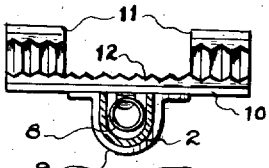
Figure 5 is a fragmentary sectional view taken on the line 5—5 of Figure 3.

To apply the clamp to the base 5, the clamp sections 6 and 7 are moved apart on the sleeve 2, so as to bring the hook-shaped flanges 11 in engagement with the upper and lower edges of the base when the said clamp sections are released. The spring 8 causes the said flanges 11 to tightly grip the base as shown in Figures 1 and 2 of the drawing.

From the foregoing description, it will be seen that a very practical means has been provided for mounting a pennant, flag or banner, or some similar device on a base such as a bumper on an automobile and that this mounting can be easily accomplished without the requirement or use of special tools or equipment.

While I have described the invention in its preferred form, and while I have used certain terms and specific language, it is understood that the embodiment of the invention as described is merely illustrative and is not to be construed in a limiting sense. The device may be used on bases other than those affiliated with motor vehicles. It may be used to support articles other than banners or flags. It is further obvious that various changes may be made by those skilled in the art without departing from the spirit of the invention as no limitations are intended other than those imposed by the scope of the appended claims.

I claim:

1. A flag holder mountable on a base comprising, a split supporting sleeve, channeled portions receiving said sleeve and one of said portions fixed to the sleeve and the other portion slidable on the sleeve, plate-like portions integral with said channeled portions and extending in opposite direction therefrom, hook-shaped flanges integral with said plate-like portions and cooperating with each other in gripping a base to dispose the said sleeve vertically relative to the said base, retaining means on said plate-like portions, and a contractile spring connecting said retaining means and lying within the sleeve for urging the plate-like portions in the direction of each other.

2. A display device, comprising in combination, a sleeve having a bottom longitudinal split and a top staff retaining socket, a fixed clamp section attached to the sleeve bottom, a slideable clamp section fitting the said sleeve and longitudinally moveable thereon between the fixed clamp section and the staff retaining socket, both of the said clamp sections having oppositely disposed co-acting hook members, and a spring member attached to the bottom of the said sleeve operating therein contiguous to the longitudinal split and engaging the slideable clamp section in a manner whereby the said hook members are urged in the direction of each other.

SHELBY D. BOSKET.